(12) United States Patent
Yu et al.

(10) Patent No.: US 10,714,813 B2
(45) Date of Patent: Jul. 14, 2020

(54) ELECTRONIC DEVICE INCLUDING COVER HAVING ANTENNA MODULE COUPLED THERETO

(71) Applicant: Samsung Electronics Co., Ltd., Suwon-si, Gyeonggi-do (KR)

(72) Inventors: Dongho Yu, Suwon-si (KR); Kucheol Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/367,634

(22) Filed: Mar. 28, 2019

(65) Prior Publication Data
US 2019/0319340 A1 Oct. 17, 2019

(30) Foreign Application Priority Data
Apr. 11, 2018 (KR) .................. 10-2018-0042078

(51) Int. Cl.
*H01Q 1/22* (2006.01)
*H01Q 5/30* (2015.01)
*H01Q 1/24* (2006.01)
*H01Q 21/06* (2006.01)
*H01R 13/24* (2006.01)

(52) U.S. Cl.
CPC ............ *H01Q 1/243* (2013.01); *H01Q 21/065* (2013.01); *H01R 13/2442* (2013.01); *H01R 13/2471* (2013.01)

(58) Field of Classification Search
CPC ........ H01Q 1/243; H01Q 1/38; H01Q 13/106; H01Q 21/065; H01Q 9/045; H01Q 21/0075
See application file for complete search history.

(56) References Cited

U.S. PATENT DOCUMENTS

| 8,954,122 B2 | 2/2015 | Wilmhoff et al. |
| 2011/0316754 A1* | 12/2011 | Nam ............... H01Q 1/243 343/702 |
| 2013/0278468 A1 | 10/2013 | Yehezkely et al. |
| 2015/0034825 A1* | 2/2015 | Debray ............ H01Q 9/16 250/332 |
| 2017/0110787 A1* | 4/2017 | Ouyang .......... H01Q 1/243 |
| 2017/0170859 A1 | 6/2017 | Noori et al. |
| 2017/0222301 A1* | 8/2017 | Shiu ............... H01Q 1/2291 |
| 2017/0244149 A1 | 8/2017 | Kim et al. |
| 2019/0252757 A1 | 8/2019 | Baek et al. |

FOREIGN PATENT DOCUMENTS

| KR | 10-0601403 B1 | 7/2006 |
| WO | 2018/043999 A1 | 3/2018 |

OTHER PUBLICATIONS

International Search Report dated Jul. 8, 2019, issued in International Patent Application No. PCT/KR2019/003720.

* cited by examiner

*Primary Examiner* — Gary Lafontant
(74) *Attorney, Agent, or Firm* — Jefferson IP Law, LLP

(57) ABSTRACT

An electronic device having a space formed between a front face and a rear face thereof is provided. The electronic device includes a first cover disposed on the front face, a second cover disposed on the rear face, a frame surrounding a periphery of the first cover and a periphery of the second cover, at least one antenna module coupled to a first face of the second cover, and a printed circuit board disposed in the space and having a front face electrically connected to the at least one antenna module.

16 Claims, 10 Drawing Sheets

ELECTRONIC DEVICE INCLUDING COVER HAVING ANTENNA MODULE COUPLED THERETO

CROSS-REFERENCE TO RELATED APPLICATION(S)

This application is based on and claims priority under 35 U.S.C. 119(a) of a Korean patent application number 10-2018-0042078, filed on Apr. 11, 2018, in the Korean Intellectual Property Office, the disclosure of which is herein incorporated by reference in its entirety.

BACKGROUND

1. Field

The disclosure relates to an electronic device including a cover having an antenna module coupled thereto for use in a next-generation communication technology.

2. Description of the Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the "Big Data" processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and a method including a cover having an antenna module coupled thereto.

Another aspect of the disclosure is to provide a next-generation communication system which may utilize a super-high-frequency band (mmWave). Therefore, in order to use the next-generation communication system, there is a need for a structure of an antenna module capable of implementing smooth communication even in the mmWave.

Meanwhile, the sizes of electronic devices and mobile devices have been getting smaller. Accordingly, there is a need for a method that is capable of efficiently arranging an antenna module used in the next-generation communication system in the inner space of an electronic device, which is gradually getting narrower.

Additional aspects will be set forth in part in the description which follows and, in part, will be apparent from the description, or may be learned by practice of the presented embodiments.

In accordance with an aspect of the disclosure, an electronic device having a space formed between the front face and the rear face is provided. The electronic device includes a first cover disposed on the front face, a second cover disposed on the rear face, a frame surrounding a periphery of the first cover and a periphery of the second cover, at least one antenna module coupled to a first face of the second cover, and a printed circuit board disposed in the space and having a front face electrically connected to the at least one antenna module.

The at least one antenna module may include an antenna array having a first face coupled to the first face of the second cover and electrically connected to the front face of the printed circuit board, and a radio communication circuit having a first face coupled to a second face of the antenna array and electrically connected to the antenna array.

The second face of the antenna array may include a first region to which the radio communication circuit is coupled, and a second region in which a coupling portion for electrical connection to the printed circuit board is disposed.

The coupling portion may include a pogo pin.

The coupling portion may include a compression connector.

The antenna array may radiate a radio wave having a specific frequency band, and the radio communication circuit may supply a radio frequency (RF) signal for radiating the radio wave to the antenna array.

The specific frequency band may be between 3 GHz and 100 GHz.

The at least one antenna module may be coupled to the first face of the second cover through at least one of adhesion, welding, bonding, inserting, outserting, or laser direct structuring (LDS).

In accordance with an aspect of the disclosure, a mobile device having a space formed between the front face and the rear face is provided. The mobile device includes a first cover disposed on the front face, a second cover disposed on the rear face, a frame surrounding a periphery of the first cover and a periphery of the second cover, at least one antenna module coupled to a first face of the second cover, and a printed circuit board disposed in the space and having a front face electrically connected to the at least one antenna module.

The at least one antenna module may include an antenna array having a first face coupled to the first face of the second cover and electrically connected to the front face of the printed circuit board, and a radio communication circuit having a first face coupled to a second face of the antenna array and electrically connected to the antenna array.

The antenna array has a second face, which may include a first region to which the radio communication circuit is coupled, and a second region in which a coupling portion for electrical connection to the printed circuit board is disposed.

The coupling portion may include a pogo pin.

The coupling portion may include a compression connector.

The antenna array may radiate a radio wave having a specific frequency band, and the radio communication circuit may supply an RF signal for radiating the radio wave to the antenna array.

The specific frequency band may be between 3 GHz and 100 GHz.

The at least one antenna module may be coupled to the first face of the second cover through at least one of adhesion, welding, bonding, inserting, outserting, or LDS.

According to an embodiment of the disclosure, an antenna module including an antenna array and a radio communication circuit is integrally coupled to an electronic device cover. Thus, it is possible to reduce the space occupied by the antenna module inside the electronic device. Through this, it is possible to improve the grip feeling of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
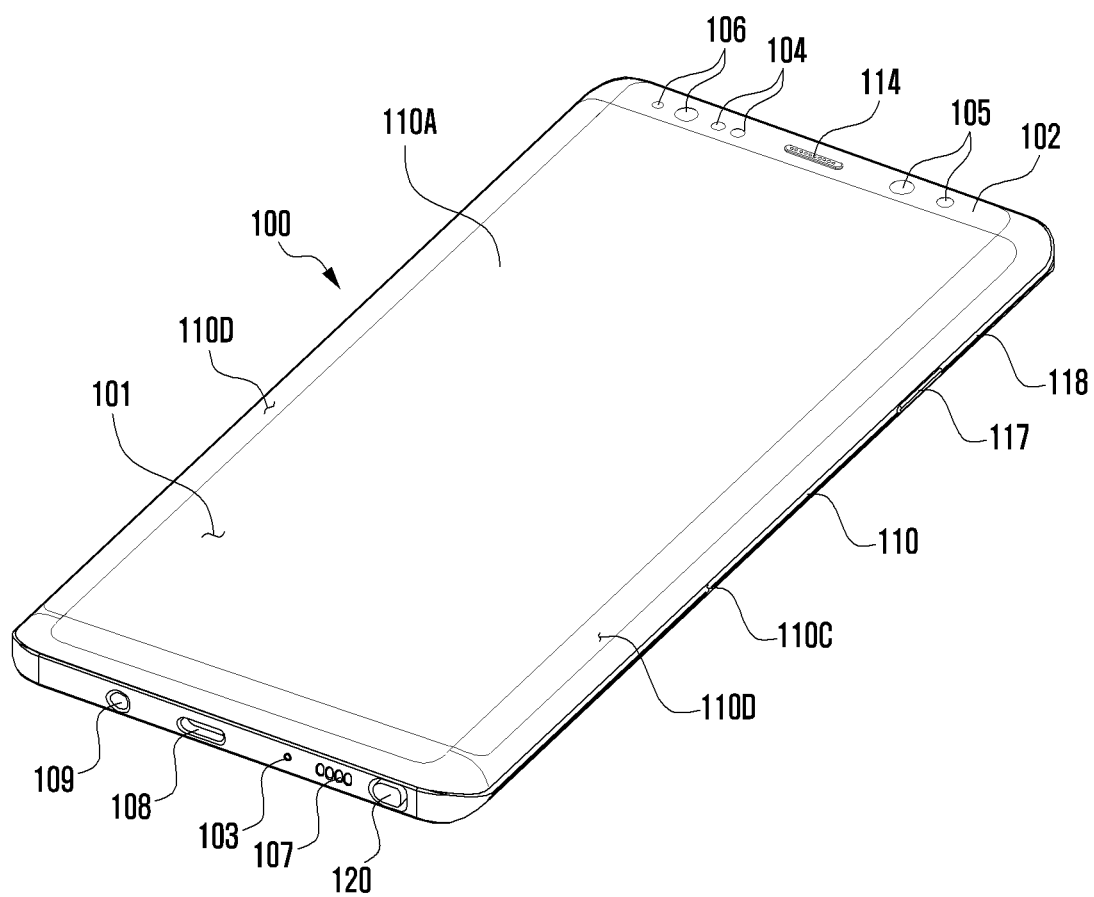
FIG. 1 is a front side perspective view of a mobile electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments of the disclosure, descriptions of technical contents that are well-known in the art and are not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements may be provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, a special purpose computer, or other programmable data processing apparatus to produce a machine, such that the instructions, which execute via the processor of the computer or other programmable data processing apparatus, implement the functions specified in the flowchart block or blocks. These computer program instructions may also be stored in a non-transitory computer usable or computer-readable memory that can direct a computer or other programmable data processing apparatus to function in a particular manner, such that the instructions stored in the non-transitory computer usable or computer-readable memory produce an article of manufacture that implements the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be configured either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided in the "units" may be either combined into a smaller number of elements and "units," or divided into a larger number of elements and "units." Moreover, the elements and "units" may be implemented to reproduce one or more central processing units (CPUs) within a device or a security multimedia card. Further, in the embodiments, the "unit" may include at least one processor.

Figure 2:
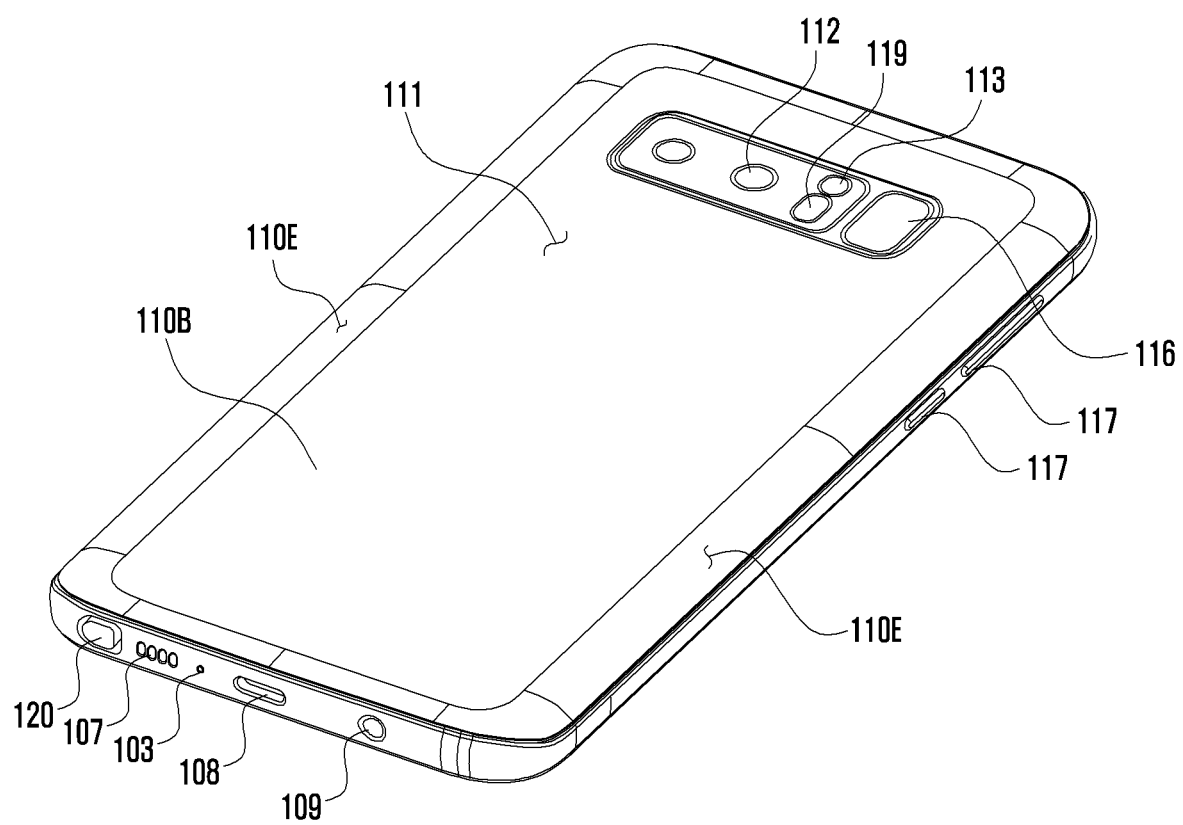
FIG. 2 is a rear side perspective view of the electronic device of FIG. 1 according to an embodiment of the disclosure.

FIG. 1 is a front side perspective view of a mobile electronic device according to an embodiment of the disclosure, and FIG. 2 is a rear side perspective view of the electronic device of FIG. 1 according to an embodiment of the disclosure.

Referring to FIGS. 1 and 2, an electronic device 100 according to an embodiment may include a housing 110 including a first surface (or front surface) 110A, a second surface (or rear surface) 110B, and a side surface 110C surrounding the space between the first surface 110A and the second surface 110B. In another embodiment (not illustrated), the housing may denote a structure that forms a part of the first surface 110A, the second surface 110B, and the side surface 110C illustrated in FIG. 1. According to an embodiment, the first surface 110A may be formed by a front plate 102, at least a part of which is substantially transparent (for example, a glass plate including various coating layers, or a polymer plate). The second surface 110B may be formed by a rear plate 111 that is substantially opaque. The rear plate 111 may be made of coated or colored glass, ceramic, polymer, metal (for example, aluminum, stainless steel (STS), or magnesium), or a combination of at least two of the above-mentioned materials. The side surface 110C may be formed by a side bezel structure (or "side member") 118 which is coupled to the front plate 102 and to the rear plate 111, and which includes metal and/or polymer. In some embodiments, the rear plate 111 and the side bezel structure 118 may be formed integrally and may include the same material (for example, a metal material such as aluminum).

In the illustrated embodiment, the front plate 102 may include two first areas 110D on both ends of the long edge of the front plate 102 such that the two first areas 110D bend from the first surface 110A toward the rear plate 111 and extend seamlessly. In the illustrated embodiment of FIG. 2, the rear plate 111 may include two second areas 110E on both ends of the long edge such that the two second areas 110E bend from the second surface 110B toward the front plate 102 and extend seamlessly. In some embodiments, the front plate 102 or the rear plate 111 may include only one of the first areas 110D or the second areas 110E. In another embodiment, a part of the first areas 110D or the second areas 110E may not be included. In the above embodiments, when seen from the side surface of the electronic device 100, the side bezel structure 118 may have a first thickness or width on a part of the side surface, which does not include the first areas 110D or the second areas 110E as described above, and may have a second thickness that is smaller than the first thickness on a part of the side surface, which includes the first areas 110D or the second areas 110E.

According to an embodiment, the electronic device 100 may include at least one of a display 101, audio modules 103, 107, and 114, sensor modules 104, 116, and 119, camera modules 105, 112, and 113, a key input device 117, a light-emitting element 106, and connector holes 108 and 109. In some embodiments, at least one of the constituent elements (for example, the key input device 117 or the light-emitting element 106) of the electronic device 100 may be omitted, or the electronic device 100 may additionally include another constituent element.

The display 101 may be exposed through a corresponding part of the front plate 102, for example. In some embodiments, at least a part of the display 101 may be exposed through the front plate 102 that forms the first areas 110D of the side surface 110C and the first surface 110A. In some embodiments, the display 101 may have a corner formed in substantially the same shape as that of the adjacent outer periphery of the front plate 102. In another embodiment (not illustrated), in order to increase the area of exposure of the display 101, the interval between the outer periphery of the display 101 and the outer periphery of the front plate 102 may be formed to be substantially identical.

In another embodiment (not illustrated), a recess or an opening may be formed in a part of the screen display area of the display 101, and at least one of an audio module 114, a sensor module 104, a camera module 105, and a light-emitting element 106 may be included and aligned with the recess or the opening. In another embodiment (not illustrated), on the back surface of the screen display area of the display 101, at least one of an audio module 114, a sensor module 104, a camera module 105, a fingerprint sensor 116, and a light-emitting element 106 may be included. In another embodiment (not illustrated), the display 101 may be coupled to or arranged adjacent to a touch sensing circuit, a pressure sensor capable of measuring the intensity (pressure) of a touch, and/or a digitizer that detects a magnetic field-type stylus pen 120. In some embodiments, at least a part of the sensor modules 104 and 119 and/or at least a part of the key input device 117 may be arranged in the first areas 110D and/or the second areas 110E.

The audio modules may be disposed proximate to a microphone hole 103 and speaker holes 107 and 114. A microphone for acquiring an external sound may be arranged in the microphone hole 103, and a plurality of microphones may be arranged therein such that the direction of a sound can be sensed in some embodiments. The speaker holes 107 and 114 may include an outer speaker hole 107 and an earpiece speaker hole 114. In some embodiments, the speaker holes 107 and 114 and the microphone hole 103 may be implemented as a single hole, or a speaker may be included (for example, a piezoelectric speaker) without the speaker holes 107 and 114.

The sensor modules 104, 116, and 119 may generate an electric signal or a data value corresponding to the internal operating condition of the electronic device 100 or the external environment condition thereof. The sensor modules 104, 116, and 119 may include, for example, a first sensor module 104 (for example, a proximity sensor) arranged on the first surface 110A of the housing 110, and/or a second sensor module (not illustrated) (for example, a fingerprint sensor), and/or a third sensor module 119 (for example, a heart rate monitor (HRM) sensor) arranged on the second surface 110B of the housing 110, and/or a fourth sensor module 116 (for example, a fingerprint sensor). The fingerprint sensor may be arranged not only on the first surface 110A (for example, the display 101) of the housing 110, but also on the second surface 110B thereof. The electronic device 100 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 104.

The camera modules 105, 112, and 113 may include a first camera module 105 arranged on the first surface 110A of the electronic device 100, a second camera module 112 arranged on the second surface 110B thereof, and/or a flash 113. The camera modules 105 and 112 may include a single lens or a plurality of lenses, an image sensor, and/or an image signal processor. The flash 113 may include, for example, a light-emitting diode (LED) or a xenon lamp. In some embodiments, two or more lenses (an infrared lens, a wide-angle lens, and a telephoto lens) and image sensors may be arranged on a single surface of the electronic device 100.

The key input device 117 may be arranged on the side surface 110C of the housing 110. In another embodiment, the electronic device 100 may not include a part of the above-mentioned key input device 117 or the entire key input device 117, and the key input device 117 (not included) may be implemented in another type, such as a soft key, on the display 101. In some embodiments, the key input device may include a sensor module 116 arranged on the second surface 110B of the housing 110.

The light-emitting element 106 may be arranged on the first surface 110A of the housing 110, for example. The light-emitting element 106 may provide information regarding the condition of the electronic device 100 in a light type, for example. In another embodiment, the light-emitting element 106 may provide a light source that interworks with operation of the camera module 105, for example. The light-emitting element 106 may include, for example, an LED, an IR LED, and a xenon lamp.

The connector holes 108 and 109 may include a first connector hole 108 capable of containing a connector (for example, a universal serial bus (USB) connector) for transmitting/receiving power and/or data to/from an external electronic device, and/or a second connector hole (for example, an earphone jack) 109 capable of containing a connector for transmitting/receiving an audio signal to/from the external electronic device.

Figure 3:
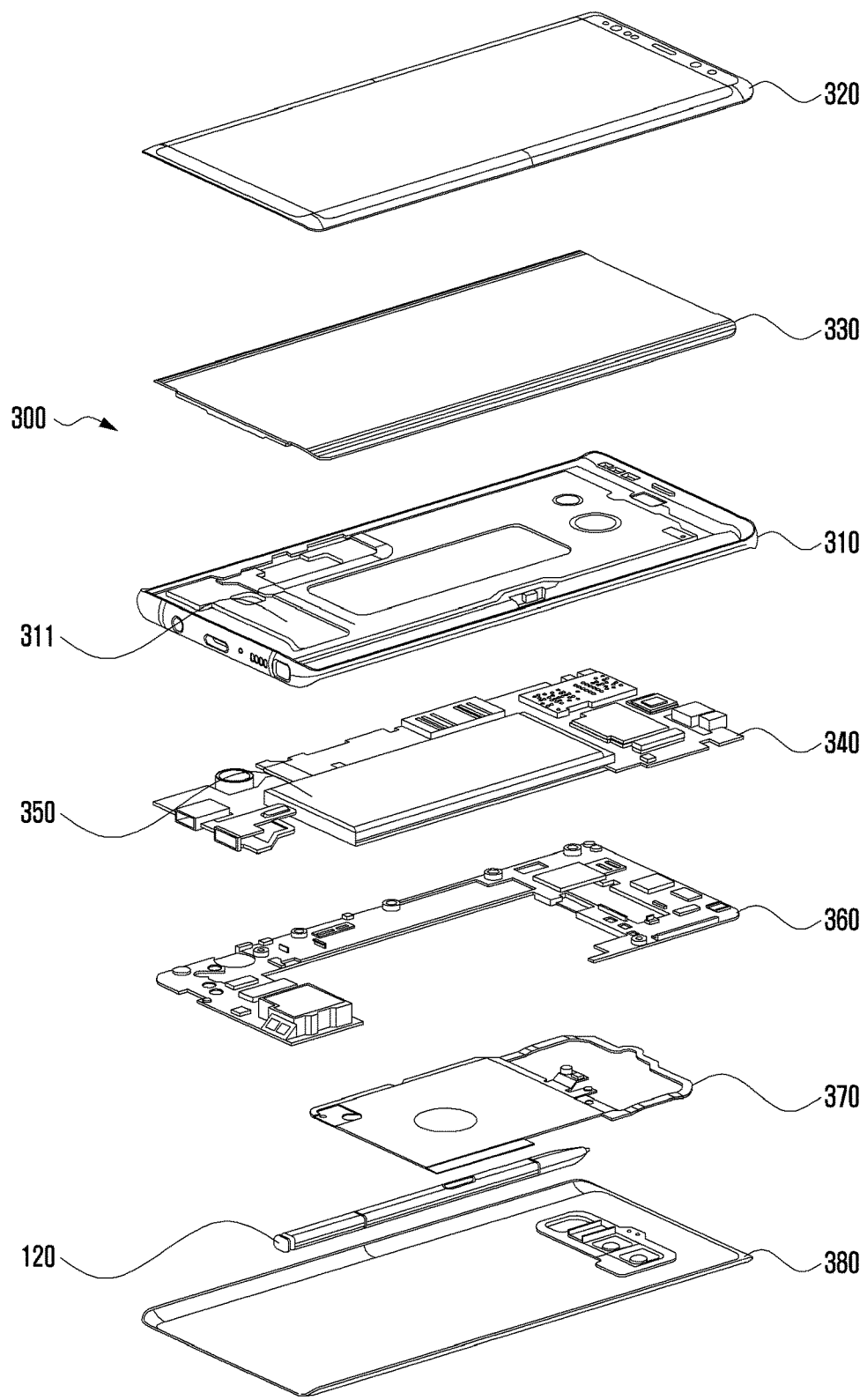
FIG. 3 is an exploded perspective view of the electronic device of FIG. 1 according to an embodiment of the disclosure.

FIG. 3 is an exploded perspective view of the electronic device of FIG. 1 according to an embodiment of the disclosure.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 100 of FIG. 1 or FIG. 2, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

The memory may include a volatile memory or a non-volatile memory, for example.

The interface may include, for example, a high definition multimedia interface (HDMI), a USB interface, a secure digital (SD) card interface, and/or an audio interface. The interface may connect the electronic device 300 with an external electronic device electrically or physically, for example, and may include a USB connector, an SD card/multimedia card (MMC) connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4:
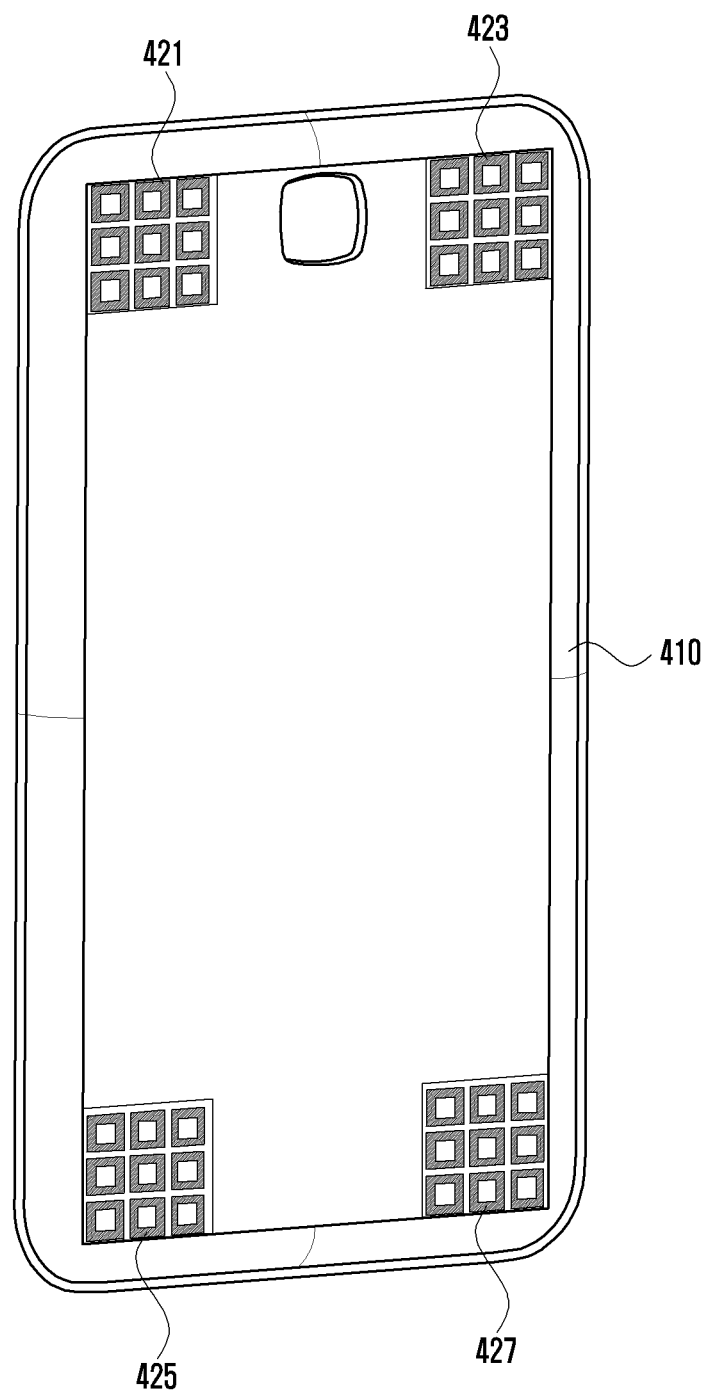
FIG. 4 is a view illustrating an electronic device cover according to an embodiment of the disclosure.

FIG. 4 is a view illustrating an electronic device cover according to an embodiment of the disclosure.

Referring to FIG. 4, an electronic device having a space formed between the front face and the rear face thereof includes a first cover disposed on the front face, a second cover 410 disposed on the rear face, and a frame surrounding the first cover and the second cover.

According to an embodiment, one or more antenna modules 421, 423, 425, and 427 may be included on a first face of the second cover 410, and a printed circuit board having a first face electrically connected to the one or more antenna modules 421, 423, 425, and 427 may be included in the space in the electronic device.

According to an embodiment, the first face of the second cover 410 on which the one or more antenna modules 421, 423, 425, and 427 are disposed may face the first cover, so that the one or more antenna modules 421, 423, 425, and 427) can be mounted in the inner space of the electronic device.

According to an embodiment, an outer peripheral edge of the second cover 410 may extend to form a curved face toward the outer peripheral edge of the frame. According to an embodiment, a space may be formed in the second cover 410 by the curved face formed on the outer peripheral edge of the second cover 410. The one or more antenna modules 421, 423, 425, and 427 may be disposed in the space.

According to an embodiment, the one or more antenna modules 421, 423, 425, and 427 may be disposed on the outer peripheral edge side of the second cover 410. For example, a first antenna module 421 may be disposed at the left end of the upper end of the second cover 410, a second antenna module 423 may be disposed at the right end of the upper end of the second cover 410, a third antenna module 425 may be disposed at the left end of the lower end of the second cover 410, and a fourth antenna module 427 may be disposed at the right end of the lower end of the second cover 410.

Meanwhile, the rear cover of the electronic device illustrated in FIG. 4 is merely an embodiment of the disclosure, and thus the scope of the disclosure should not be construed as being limited thereto. For example, the number and locations of the antenna modules disposed in the rear cover may vary by a person ordinarily skilled in the art.

Figure 5A:
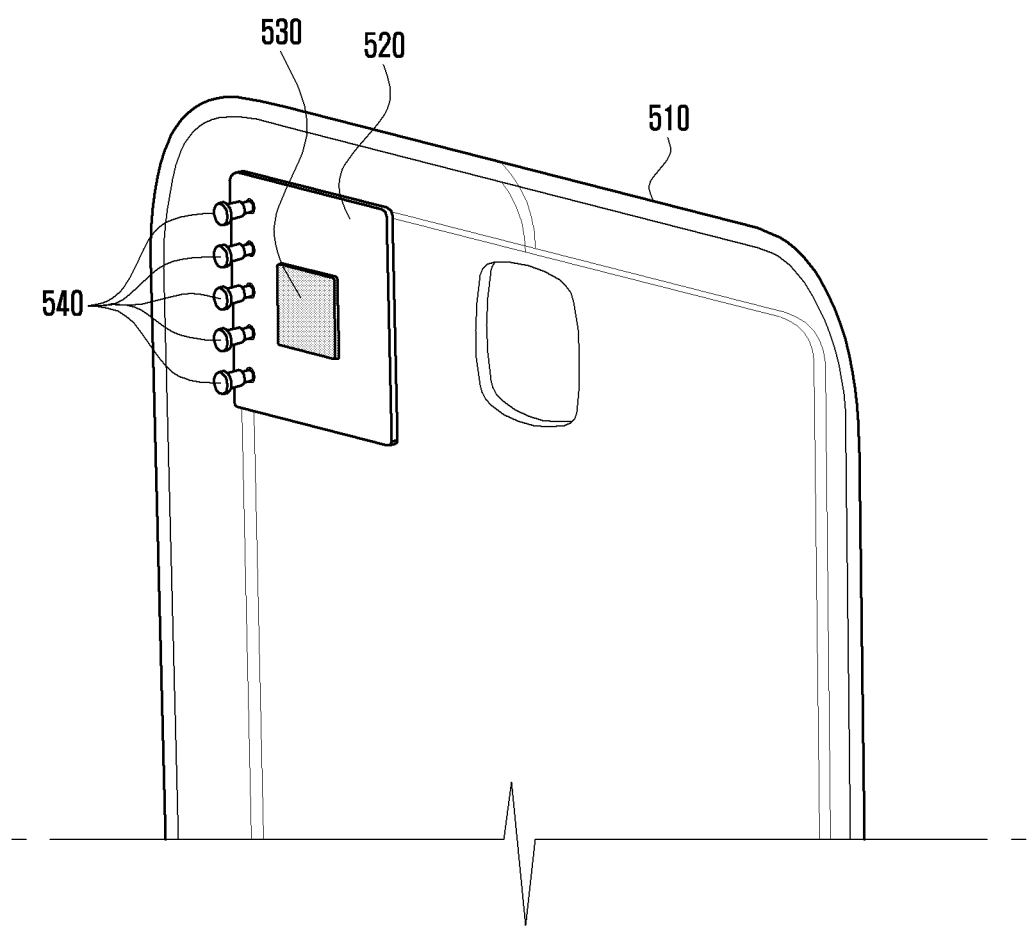
FIG. 5A is a view illustrating a first face of a rear cover of an electronic device according to a first embodiment of the disclosure.

FIG. 5A is a view illustrating a first face of a rear cover of an electronic device according to a first embodiment of the disclosure.

Referring to FIG. 5A, an antenna module disposed on the rear cover 510 of an electronic device includes an antenna array 520 having a first surface coupled to a first face of the rear cover to be electrically connected to a first face of a printed circuit board (not illustrated) and a radio communication circuit 530 having a first face coupled to a second face of the antenna array 520 to be electrically connected to the antenna array 520.

According to an embodiment, the second face of the antenna array 520 includes a first region to be coupled to the radio communication circuit 530 and a second region in which a second coupling portion 540 for electrical connection with the printed circuit board is disposed. According to an embodiment, the second coupling portion 540 may include a pogo pin, and a plurality of pogo pins may be disposed as the second coupling portion 540 in the second region.

According to an embodiment, the antenna array 520 radiates a radio wave having a specific frequency band, and the radio communication circuit 530 may supply a radio frequency (RF) signal for radiating the radio wave having the specific frequency band to the antenna array 520. According to an embodiment, the specific frequency band may be between 20 GHz and 100 GHz, and may be a frequency band used in a next-generation communication system.

According to an embodiment, the outer peripheral edge of the rear cover 510 may extend while forming a curved surface toward the outer peripheral edge of the frame, so that a space can be formed in the rear cover 510.

According to an embodiment, the antenna module may be disposed in the space formed inside the rear cover 510. According to an embodiment, the antenna array 520 may be disposed in the space formed inside the rear cover 510, and the radio communication circuit 530 may be disposed in the space formed inside the rear cover 510 or may be exposed to the outside of the space depending on the height of the space formed inside the rear cover 510.

Figure 5B:
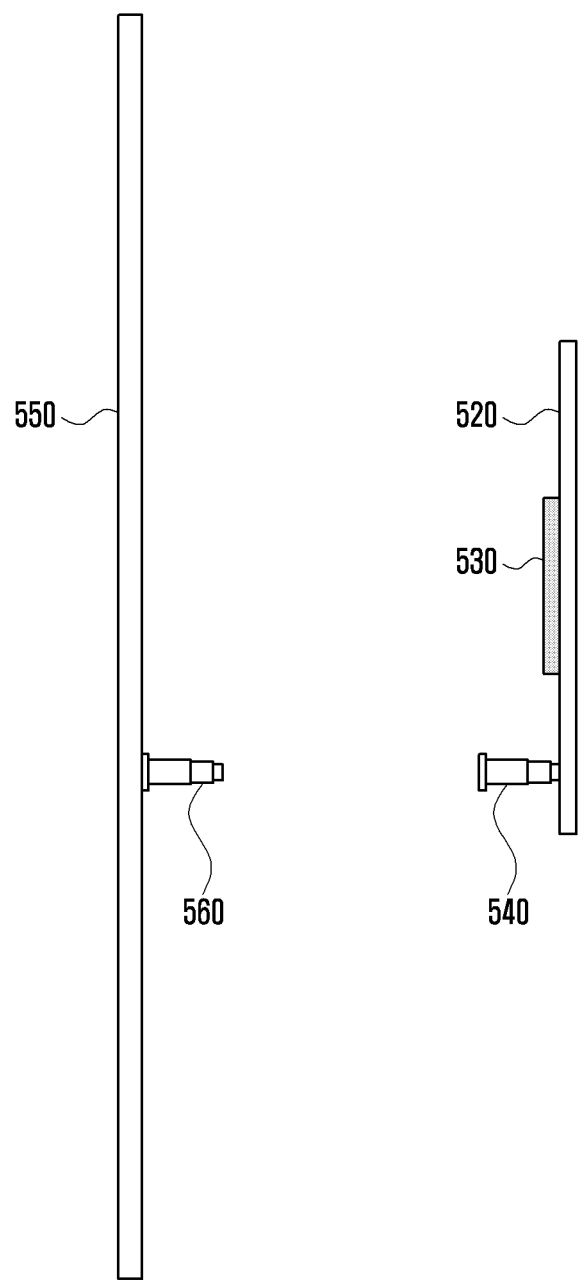
FIG. 5B is a side view of an antenna module and a printed circuit board according to the first embodiment of the disclosure.

FIG. 5B is a side view of an antenna module and a printed circuit board according to the first embodiment of the disclosure.

Referring to FIG. 5B, a first coupling portion 560 to be electrically connected to the antenna array 520 may be disposed on a first face of the printed circuit board 550. For example, the first coupling portion 560 may include a pogo pin.

According to an embodiment, a second coupling portion 540 may be disposed on the antenna array 520 to correspond to the position of the first coupling portion 560 disposed on the first face of the printed circuit board 550. For example, the second coupling portion 540 may include a pogo pin.

According to an embodiment, the antenna module including the antenna array 520 and the radio communication circuit 530 may be disposed in the space formed inside the rear cover, and the printed circuit board 550 may be disposed in the space formed between the rear cover and the front cover.

Therefore, according to the electronic device structure disclosed by the disclosure, the antenna module may be separated from the printed circuit board and disposed in the space formed inside the rear cover, so that more space can be secured between the front cover and the rear cover of the electronic device. In addition, by integrating the antenna array and the radio communication chip, it is possible to minimize a loss caused by a transmission line between the antenna array and the radio communication chip.

Figure 6A:
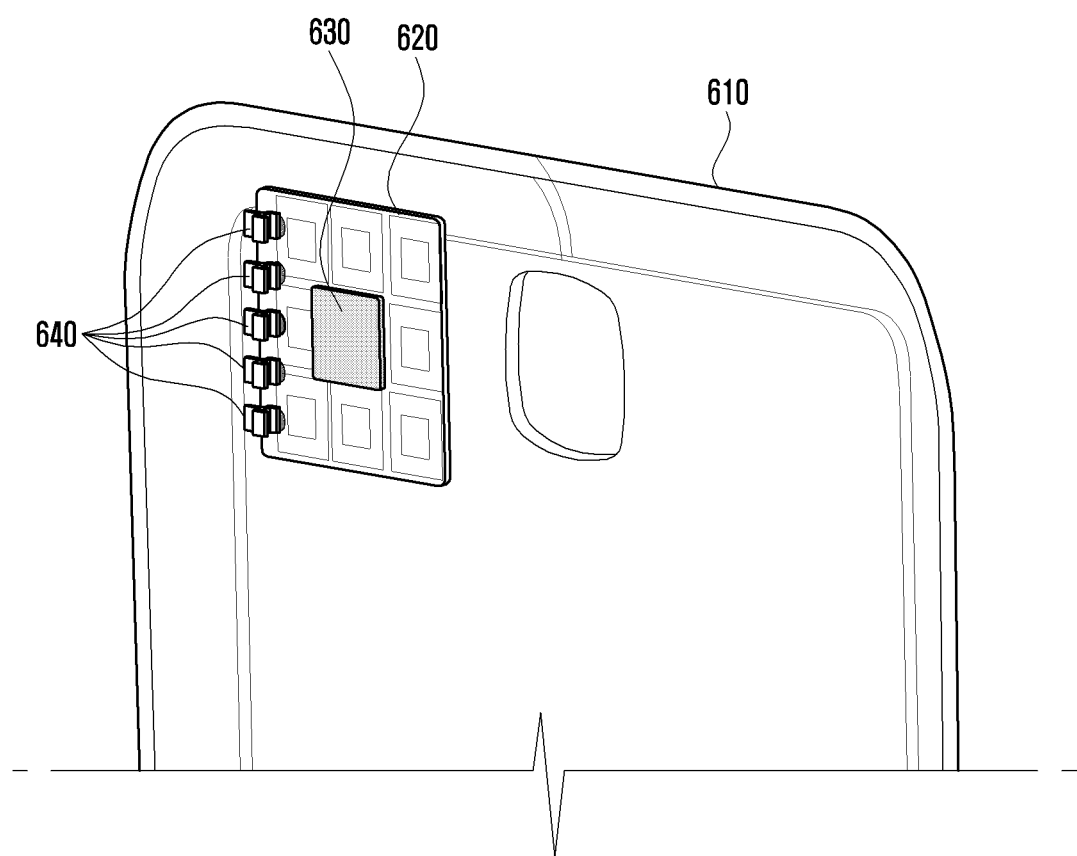
FIG. 6A is a view illustrating a first face of a rear cover of an electronic device according to a second embodiment of the disclosure.

FIG. 6A is a view illustrating a first face of a rear cover of an electronic device according to a second embodiment of the disclosure.

Referring to FIG. 6A, the second face of the antenna array 620 includes a first region to be coupled to the radio communication circuit 630 and a second region in which a second coupling portion 640 for electrical connection with the printed circuit board (not illustrated) is disposed. According to an embodiment, the second coupling portion 640 may include a connector, and a plurality of connectors may be disposed as the second coupling portion 640 in the second region.

Since the configurations of the rear cover 610, the antenna array 620, and the radio communication circuit 630 illustrated in FIG. 6A are the same as or similar to those described with reference to FIG. 5A, and a detailed description thereof will be omitted.

Figure 6B:
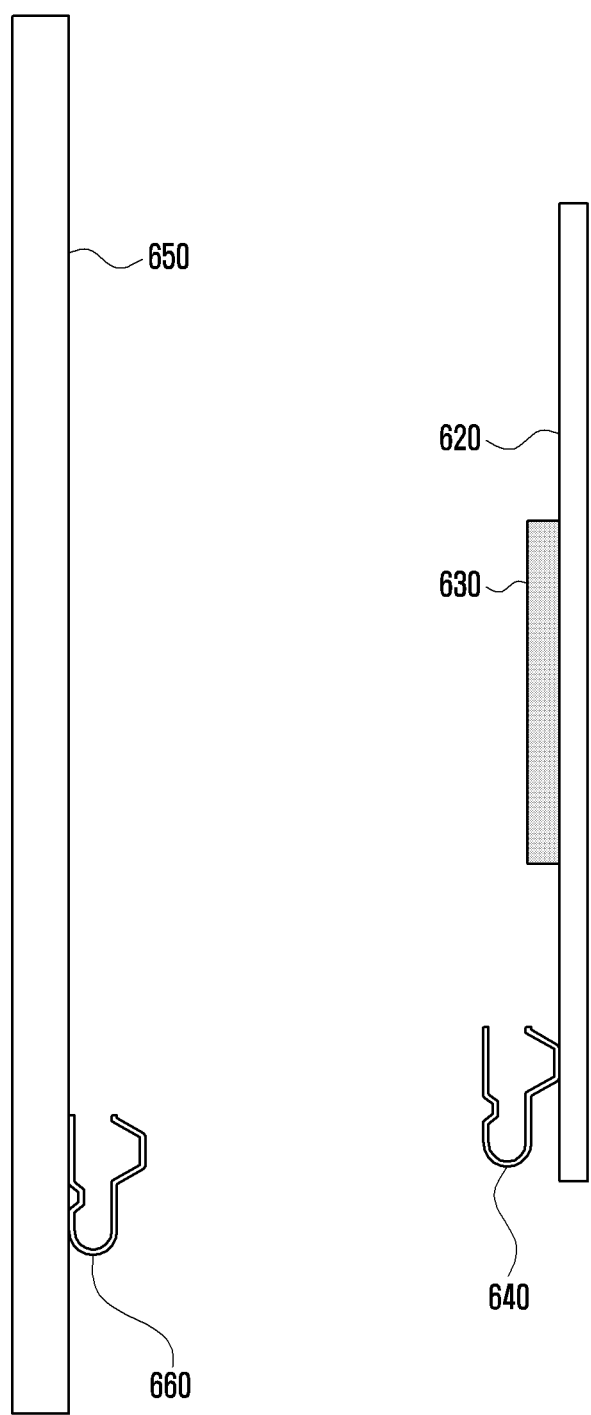
FIG. 6B is a side view of an antenna module and a printed circuit board according to the second embodiment of the disclosure.

FIG. 6B is a side view of an antenna module and a printed circuit board according to the second embodiment of the disclosure.

Referring to FIG. 6B, a first coupling portion 660 to be electrically connected to the antenna array 620 may be disposed on a first face of the printed circuit board 650. For example, the first coupling portion 660 may include a connector.

According to an embodiment, a second coupling portion 640 may be disposed on the antenna array 620 to correspond to the position of the first coupling portion 660 disposed on the first face of the printed circuit board 650. For example, the second coupling portion 640 may include a connector.

According to an embodiment, the antenna module including the antenna array 620 and the radio communication circuit 630 may be disposed in the space formed inside the rear cover, and the printed circuit board 650 may be disposed in the space formed between the rear cover and the front cover.

Figure 7A:
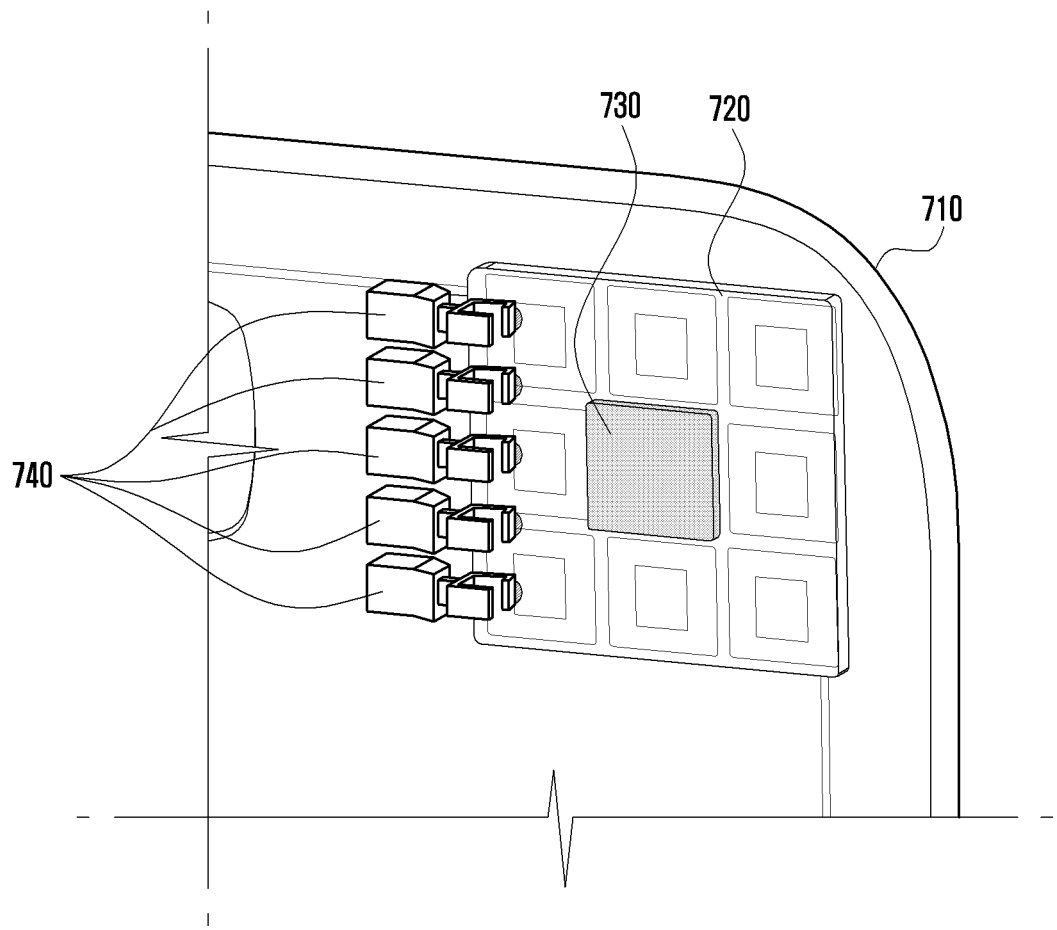
FIG. 7A is a view illustrating a first face of a rear cover of an electronic device according to a third embodiment of the disclosure.

FIG. 7A is a view illustrating a first face of a rear cover of an electronic device according to a third embodiment of the disclosure.

Referring to FIG. 7A, the second face of the antenna array 720 includes a first region to be coupled to the radio communication circuit 730 and a second region in which a second coupling portion 740 for electrical connection with the printed circuit board (not illustrated) is disposed. According to an embodiment, the second coupling portion 740 may include a compression connector or hot bar anisotropic conductive film (ACF) bonding, and a plurality of compression connectors may be disposed as the second coupling portion 740 in the second region.

Since the configurations of the rear cover 710, the antenna array 720, and the radio communication circuit 730 illustrated in FIG. 7A are the same as or similar to those described with reference to FIG. 5A and FIG. 6A, and a detailed description thereof will be omitted.

Figure 7B:
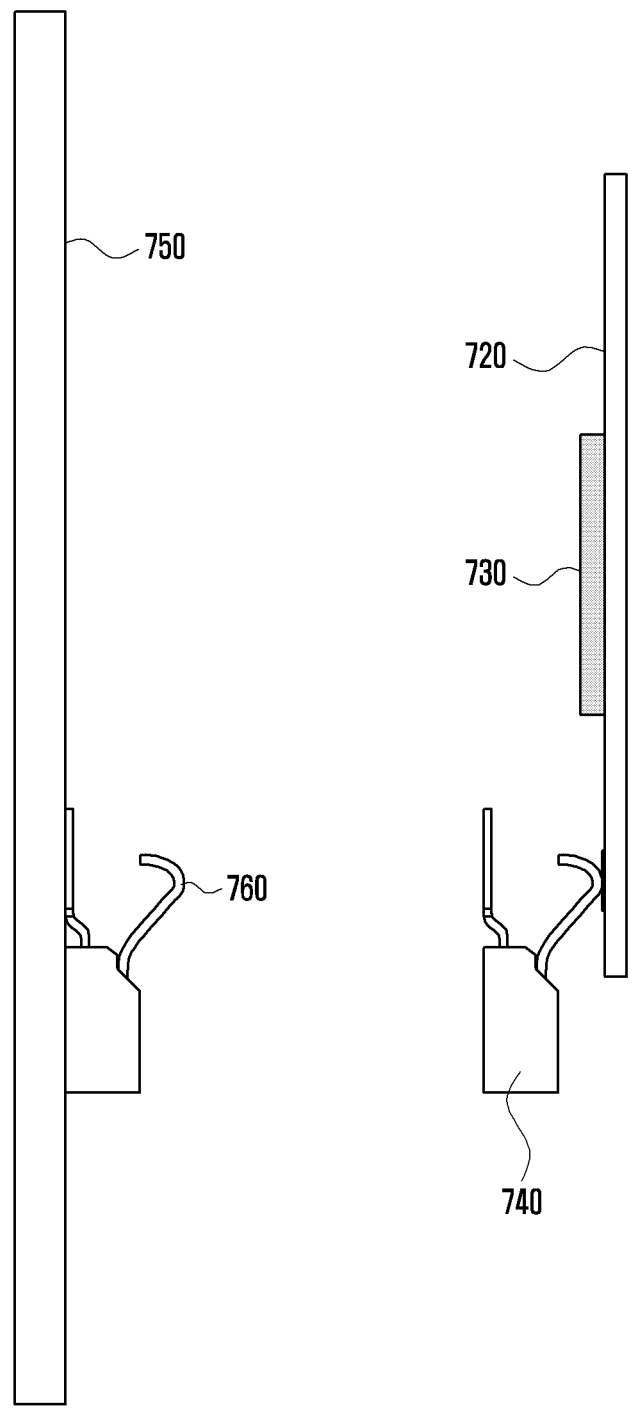
FIG. 7B is a side view of an antenna module and a printed circuit board according to the third embodiment of the disclosure.

FIG. 7B is a side view of an antenna module and a printed circuit board according to the third embodiment of the disclosure.

Referring to FIG. 7B, a first coupling portion 760 to be electrically connected to the antenna array 720 may be disposed on a first face of the printed circuit board 750. For example, the first coupling portion 760 may include a compression connector.

According to an embodiment, a second coupling portion 740 may be disposed on the antenna array 720 to correspond to the position of the first coupling portion 760 disposed on the first face of the printed circuit board 750. For example, the second coupling portion 740 may include a compression connector.

According to an embodiment, the antenna module including the antenna array 720 and the radio communication circuit 730 may be disposed in the space formed inside the rear cover, and the printed circuit board 750 may be disposed in the space formed between the rear cover and the front cover.

Meanwhile, the antenna module including the radio communication circuit and the antenna array may be coupled to the rear cover of the electronic device in various manners. According to an embodiment, the antenna module may be coupled to the rear cover of the electronic device through at least one of thermal fusion, adhesion, and bonding.

According to an embodiment, an antenna pattern may be disposed inside the rear cover of the electronic device, and the antenna array may be disposed inside the rear cover of the electronic device through plating inside the cover. Alternatively, the antenna array may be integrally formed inside the rear cover of the electronic device through insert injection molding.

According to an embodiment, an antenna pattern may be plated on a film, or a film having an antenna pattern may be printed on the rear cover of the electronic device. Alternatively, the antenna film manufactured through the above-described method may be inserted into an injection molding machine so as to secondarily mold the rear cover of the electronic device and the antenna film.

Meanwhile, the embodiments of the disclosure disclosed in the present specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of the methods proposed in the disclosure may be combined to operate a base station and a terminal.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device having a space formed between a front face and a rear face thereof, the electronic device comprising:
   a first cover disposed on the front face;
   a second cover disposed on the rear face;
   a frame surrounding a periphery of the first cover and a periphery of the second cover;
   at least one antenna module coupled to a first face of the second cover; and
   a printed circuit board disposed in the space, and having a front face coupled to a face of the at least one antenna module and electrically connected to the at least one antenna module.

2. The electronic device of claim 1, wherein the at least one antenna module comprises:
an antenna array having a first face coupled to the first face of the second cover and electrically connected to the front face of the printed circuit board; and
a radio communication circuit having a first face coupled to a second face of the antenna array and electrically connected to the antenna array.

3. The electronic device of claim 2, wherein the second face of the antenna array comprises:
a first region to which the radio communication circuit is coupled; and
a second region in which a coupling portion for electrical connection to the printed circuit board is disposed.

4. The electronic device of claim 3, wherein the coupling portion comprises a pogo pin.

5. The electronic device of claim 3, wherein the coupling portion comprises a compression connector.

6. The electronic device of claim 2,
wherein the antenna array is configured to radiate a radio wave having a specific frequency band, and
wherein the radio communication circuit is configured to supply a radio frequency (RF) signal for radiating the radio wave to the antenna array.

7. The electronic device of claim 6, wherein the specific frequency band is between 3 GHz and 100 GHz.

8. The electronic device of claim 1, wherein the at least one antenna module is coupled to the first face of the second cover through at least one of adhesion, welding, bonding, insert, outsert, or laser direct structuring (LDS).

9. A mobile device having a space formed between a front face and a rear face thereof, the mobile device comprising:
a first cover disposed on the front face;
a second cover disposed on the rear face;
a frame surrounding a periphery of the first cover and a periphery of the second cover;
at least one antenna module coupled to a first face of the second cover; and
a printed circuit board disposed in the space, and having a front face coupled to a face of the at least one antenna module and electrically connected to the at least one antenna module.

10. The mobile device of claim 9, wherein the at least one antenna module comprises:
an antenna array having a first face coupled to the first face of the second cover and electrically connected to the front face of the printed circuit board; and
a radio communication circuit having a first face coupled to a second face of the antenna array and electrically connected to the antenna array.

11. The mobile device of claim 10, wherein the second face of the antenna array comprises:
a first region to which the radio communication circuit is coupled; and
a second region in which a coupling portion for electrical connection to the printed circuit board is disposed.

12. The mobile device of claim 11, wherein the coupling portion comprises a pogo pin.

13. The mobile device of claim 11, wherein the coupling portion comprises a compression connector.

14. The mobile device of claim 10,
wherein the antenna array is configured to radiate a radio wave having a specific frequency band, and
wherein the radio communication circuit is configured to supply a radio frequency (RF) signal for radiating the radio wave to the antenna array.

15. The mobile device of claim 14, wherein the specific frequency band is between 3 GHz and 100 GHz.

16. The mobile device of claim 9, wherein the at least one antenna module is coupled to the first face of the second cover through at least one of adhesion, welding, bonding, inserting, outserting, or laser direct structuring (LDS).

* * * * *